(12) United States Patent
Richards et al.

(10) Patent No.: US 9,787,228 B2
(45) Date of Patent: Oct. 10, 2017

(54) ELECTRICAL CONTROLLER FOR MACHINES

(71) Applicant: Aeristech Control Technologies Limited, Warwickshire (GB)

(72) Inventors: Bryn Geoffrey Roddick Richards, Warwickshire (GB); Wenshan Hu, Warwickshire (GB)

(73) Assignee: Aeristech Control Technologies Limited, Kenilworth (GB)

( * ) Notice: Subject to any disclaimer, the term of this patent is extended or adjusted under 35 U.S.C. 154(b) by 0 days.

(21) Appl. No.: 14/696,566

(22) Filed: Apr. 27, 2015

(65) Prior Publication Data

US 2015/0229248 A1    Aug. 13, 2015

Related U.S. Application Data

(63) Continuation of application No. 13/806,246, filed as application No. PCT/GB2011/000937 on Jun. 22, 2011, now Pat. No. 9,041,328.

(30) Foreign Application Priority Data

Jun. 22, 2010    (GB) .................................. 1010443.8

(51) Int. Cl.
*H02P 23/00*    (2016.01)
*H02P 6/00*    (2016.01)
(Continued)

(52) U.S. Cl.
CPC ................ *H02P 6/002* (2013.01); *F01N 5/04* (2013.01); *F02B 39/10* (2013.01); *H02K 21/12* (2013.01);
(Continued)

(58) Field of Classification Search
CPC .... H02P 6/16; H02P 6/00; H02P 6/147; H02P 2007/054
(Continued)

(56) References Cited

U.S. PATENT DOCUMENTS 4,401,934 A    8/1983    Carlisle et al.
5,317,245 A    5/1994    Moritz et al.
(Continued)

FOREIGN PATENT DOCUMENTS

EP    1 555 748 A2    7/2005
EP    2 102 469    9/2009
(Continued)

OTHER PUBLICATIONS

Office Action issued from the Japanese Patent Office for Japanese Patent Application No. 2013-515954 dated May 19, 2015.
(Continued)

*Primary Examiner* — Bickey Dhakal
(74) *Attorney, Agent, or Firm* — Andrus Intellectual Property Law, LLP (57) ABSTRACT

An electrical controller for electric rotating machines is provided. A control system for electric rotating machines transmits a controlled quantity of current to or from different windings of the electric rotating machine at any given time. Furthermore, the amplitude of the current is independently variable of the timing and duration of the transmission of the current to or from the windings. This allows increased control of the electric rotating machine and facilitates the operation of the electric motor at high mechanical and/or electrical speeds.

15 Claims, 7 Drawing Sheets

(51) Int. Cl.

| | |
|---|---|
| *H02K 21/16* | (2006.01) |
| *H02P 6/06* | (2006.01) |
| *H02P 25/026* | (2016.01) |
| *H02P 27/06* | (2006.01) |
| *H02K 21/12* | (2006.01) |
| *F01N 5/04* | (2006.01) |
| *F02B 39/10* | (2006.01) |
| *H02P 6/08* | (2016.01) |
| *H02P 6/18* | (2016.01) |
| *H02P 9/02* | (2006.01) |
| *H02P 6/28* | (2016.01) |
| *H02P 6/15* | (2016.01) |
| *H02P 25/03* | (2016.01) |
| *H02K 1/27* | (2006.01) |

(52) U.S. Cl.
CPC .............. *H02K 21/16* (2013.01); *H02P 6/06* (2013.01); *H02P 6/08* (2013.01); *H02P 6/157* (2016.02); *H02P 6/18* (2013.01); *H02P 6/28* (2016.02); *H02P 9/02* (2013.01); *H02P 25/026* (2013.01); *H02P 25/03* (2016.02); *H02P 27/06* (2013.01); *H02K 1/278* (2013.01); *H02P 2201/07* (2013.01); *H02P 2201/11* (2013.01)

(58) Field of Classification Search
USPC ......................................................... 318/603
See application file for complete search history.

(56) References Cited

U.S. PATENT DOCUMENTS

| | | | |
|---|---|---|---|
| 5,541,484 A | 7/1996 | Ditucci | |
| 5,672,948 A * | 9/1997 | Cohen | H02P 6/182 318/400.17 |
| 5,982,067 A | 11/1999 | Sebastian et al. | |
| 9,634,591 B2 * | 4/2017 | Qian | H02P 6/16 |
| 2006/0119300 A1 | 6/2006 | Armstrong | |
| 2010/0018203 A1 * | 1/2010 | Richards | F01D 15/10 60/598 |
| 2011/0084640 A1 * | 4/2011 | Brown | H02P 6/185 318/400.35 |

FOREIGN PATENT DOCUMENTS

| | | |
|---|---|---|
| JP | S53-163617 U1 | 12/1978 |
| JP | 3317000 B2 | 8/2002 |
| JP | 2007-218223 | 8/2007 |
| WO | 2008/068453 A1 | 6/2008 |

OTHER PUBLICATIONS

Noguchi et al., "200,000-r/min, 2-kW PM Motor Drive for Turbocharger", Electrical Engineering in Japan, vol. 161, No. 3, Jan. 1, 2007, pp. 31-40.
Noguchi et al., "200,000-r/min, 2-kW PM Motor Drive for Turbocharger", IEE-Japan Int. Power Elec. Conf (IPEC), Niigata, Mar. 4, 2005, pp. 2280-2285.
Noguchi et al., 1.5 kW,, 150,000-r/min Ultra High-Speed PM Motor Fed by 12-V Power Supply for Automotive Supercharger, 13th European Conference on Power Electronics and Applications, Sep. 8, 2009, pp. 1-10.
Takahashi et al., "A Super High Speed PM Motor Drive System by a Quasi-Current Source Inverter", IEEE Transactions on Industry Applications, vol. 30, No. 3, May 1, 1994, pp. 683-689.
PCT Search Report and Written Opinion dated Jan. 16, 2013.
GB Search Report dated Nov. 3, 2010.
European Office Action for European Patent Application No. 11 740 965.6-1807 dated Jun. 24, 2014.
Translation of Office Action for Korean Patent Application No. 10-2013-7001592 dated Apr. 26, 2017.
Office Action for European Patent Application No. 11 740 965.6 dated Aug. 22, 2017.

* cited by examiner

ELECTRICAL CONTROLLER FOR MACHINES

CROSS REFERENCE TO RELATED APPLICATION

The present application is a continuation of U.S. patent application Ser. No. 13/806,246, filed Feb. 4, 2013, which claims priority to PCT/GB2011/000937, filed Jun. 22, 2011, and published in English on Dec. 29, 2011 as Publication No. WO 2011/161408, which claims priority to GB Application No. 1010443.8, filed Jun. 22, 2010, incorporated herein by reference.

This present invention relates to an electrical controller for electric motors. In particular, the invention relates to a system for improving the control and operation of Alternating Current motors, wherein permanent magnets or steadily excited electromagnets move in the presence of stationary electrical windings. These motors will be referred to collectively as permanent magnet Alternating Current (PMAC) motors (although some may substitute steadily excited electromagnets for permanent magnets). PMAC motors may be found, for example, in high-speed hybrid turbochargers or other high-speed electrical devices.

Conventional PMAC motors utilise the movement of permanent magnets in the presence of stationary electrical windings. The stator windings must be excited by an oscillating or intermittent electrical current (i.e., AC or PWM) in order to exert an electromotive force upon the magnets as the magnets rotate or translate relative to the windings. Such motors are typically described as brushless alternating current permanent magnet motors or permanent magnet synchronous motors (PMSM). It is important to note that such motors are distinct from brushless direct current permanent magnet motors that have a different construction and control methodology.

Brushless AC permanent magnet motors are among the most mechanically simple, compact, and efficient types of motors. However, throughout the history of electric motors, practical embodiments have usually incorporated design features which compromise simplicity, compactness, and efficiency in order to impart favourable operating characteristics that simplify the task of controlling the motor. Examples of compromises include:

1. field weakening to limit speed from the inherent properties of the motor;
2. helical magnets to improve starting torque and predictability at low speeds;
3. electromagnets rather than permanent magnets to allow motor torque to be adjusted by the direct current signal powering the electromagnets;
4. a distribution of stator windings chosen in such a way as to smooth the torque output of the motor given a smooth alternating current (oscillating) input;
5. variable air gap (especially in 'axial flux' type motors) to allow the motor constant (relationship between current input and torque output) to be adjusted by mechanical means; and
6. the use of weaker magnets or passively excited (metallic) materials to reduce the sensitivity of the motor to the shape of the input alternating current signal.

Electric motors usually operate at speeds below 200 Hz (e.g., electric cars=20 Hz to 100 Hz, automotive starter motors=30 Hz to 50 Hz, UK power station generators=50 Hz, typical pump motors=50 Hz, domestic appliances=10 Hz to 50 Hz, conveyors and pulleys=1 Hz to 50 Hz).

High-speed applications have typically favoured design approach number 7 from the above list: the use of passively excited materials. Examples include: J R Bumby, E Spooner, & M Jagiela, "Solid Rotor Induction Machnies for use in Electrically-Assisted Turbochargers", Proceedings of the XVII International Conference on Electric Machines (ICEM), 2006; and S Calverly, "High-speed switched reluctance machine for automotive turbo-generators", Mag. Soc. Seminar on Motors and Actuators for Automotive Applications, 2002.

Incorporation of the above design features significantly adds to the size, weight, cost and energy efficiency of motors. Additionally, for any chosen design, motor size, weight, and cost are typically proportional to torque output. Motors that operate at higher speeds can deliver equivalent power at lower torque, so equipment and transmissions are often specified to accommodate higher-speed motors where possible. However, higher speeds tend to exacerbate the challenges associated with motor control.

One application area of particular interest is turbomachinery. These devices, which operate upon gas at speeds approaching the sound barrier, spin at speeds in excess of 1,500 Hz. Turbomachines are well-known in aerospace and natural gas power generation, but they are increasingly found in automotive engines (turbochargers), industrial processes (compressors and heat recovery systems), domestic appliances (vacuum cleaners), and building heating and ventilation. The increasing popularity of turbo machines in comparison to fixed-displacement pumps and expansion chambers has created a further demand for high-speed motors and provides the prospect of reducing or eliminating the cost of high-ratio transmissions if higher-speed motors can be supplied. Of particular interest for the present invention is the electrification of the automotive turbocharger, which is the subject of an earlier patent (B Richards, "Turbocharger concept", UK Patent no. 0624599.7, 2006).

Turbomachines require operating speeds in excess of 1,500 Hz, and some automotive applications require speeds above 2,500 Hz. Typical motor speeds below 200 Hz are not suitable for this application. Design compromises which use weaker magnets or passively magnetised materials can achieve speeds approaching 1,500 Hz, but these have relatively low power density. A typical 20 kW turbo compressor is approximately 15 cm×15 cm×10 cm in shape and requires approximately 1.6 Nm torque input in steady state. A typical passively excited electric motor operating at the same speed could supply the required torque from a sufficiently large motor. But such a motor would have a large rotor inertia. As the motor increases further in size to provide excess torque to overcome its own inertia during transient acceleration, the inertia of the motor increases in proportion to the extra torque produced, giving diminishing returns. By contrast, a motor with strong permanent magnets can achieve 10 times the torque from the same volume, allowing the motor to be smaller (on the order of 10 cm×10 cm×10 cm for 2 Nm) while still providing sufficient torque for acceleration. A problem of managing controller current remains.

Because of the design advantages described above and the emerging applications for high-speed machines, there has been an overall trend in the past three decades towards motors that are ever more difficult to control. This trend has coincided with, and depended upon, the widespread improvement of electronics and computers that enable ever more sophisticated control strategies.

Conventional brushless permanent magnet motors are generally either of the DC or AC type. Brushless DC motors accept 'rough' voltage input and smooth the flow of current internally by the inductance and resistance of the motor windings. Brushless AC motors (also called synchronous motors) require a smooth, sinusoidal (or near sinusoidal) current to be imparted by the controller. Neither is designed to accept 'rough' waveforms of current input.

The conventional approach to controlling a brushless permanent magnet motor is pulse width modulation (PWM). An example of this approach (relating specifically to PMAC) is shown in EP 2,159,909. This document utilises rapid PWM to simulate a smooth sine wave voltage input to the motor. This allows for precise control of position and smooth operation of the motor (especially at low speeds).

Brushless DC permanent magnet motors also use PWM to control the amplitude and phase of the motor's input voltage. The principle distinction between a brushless DC and a brushless AC permanent magnet machine is that a brushless AC motor additionally requires its PWM controller to synthesize a sinusoidal signal, while DC allows the PWM output to be a 'rough' voltage waveform. In either case (DC or AC), PWM generates a motor control signal of fixed amplitude and frequency and applies the signal at each commutation. The supply of the required signal, for example 'rough' (DC) or sinusoidal (AC), is achieved by varying the number and duration of pulses supplied to the motor. This generally entails providing several pulses per commutation of the motor to try to approximate the ideal waveform input required for the motor used. The overall amplitude (or voltage) supplied by PWM is therefore controlled by varying the number and duration of pulses supplied to the motor for any given phase.

However, use of a PWM controller is calculation intensive and necessitates the controller to operate at a frequency at least 10× (typically 100× or more) in excess of the rotational frequency of the motor. This means, for example, that an automotive turbocharger compressor would require a controller with at least 15,000 Hz internal operating frequency. This is well within reach for low-power logic circuits, but it approaches the limits of what can be achieved with high-powered electronic circuitry today.

A controller that may be embodied by the invention of the present application which will be described below produces 'rough' wave forms of current and requires (or corresponds to) a motor with an atypical design.

The proposed motor is of the brushless permanent magnet type, with properties that are different from either a typical brushless AC or brushless DC permanent magnet motor. The properties of this motor are known in the art, but this selection and combination of properties is unusual. Specifically, this motor has properties which enhance its ability to accept 'rough' waveforms of current (or, in the case of a generator, its tendency to produce 'rough' waveforms) and may be used in an advantageous way with the controllers embodying the present invention. Its properties are:

a. rotor magnets made of materials with strong permanent magnet properties and shaped in such a way as to have constant thickness through the angular dimension corresponding to shaft rotation and distributed about the rotor without gaps (all of which design features cause the electromagnetic field experienced by the windings near the magnets' edge to be similar in strength to the electromagnetic field experienced near the middle of the magnets);

b. a number of teeth (metal elements around which stator windings are wrapped) which is divisible by the number of electrical phase connections provided by the motor and a winding pattern such that any collection of series- or parallel-connected windings which constitutes a phase will everywhere be subjected to an identical (varying through shaft rotation but everywhere and at all times equivalent to each other) electromagnetic field arising from the motor magnets (so that all the windings in a phase are complementary and do not serve to counteract one another, at any rotational angle of the shaft);

c. a number of magnets ('poles') chosen such that b is implementable;

d. magnet angular thickness (arc length) and winding pitch (number of teeth spanned by a single winding loop) chosen so that the angle of rotation of the rotor through which an interface between adjacent magnets of opposing polarity passes within the span of a winding loop matches precisely the phase angle (proportion of the period of oscillation) through which the controller will maintain maximum current through that winding loop; and e. minimum winding inductance achieved by a preference towards the individual wire loops forming the windings being connected in parallel rather than series to the extent allowed by other considerations such as the current and voltage specifications to which the motor must conform (in recognition of the fact that greater internal inductance will tend to smooth and delay the signals produced by the controller, with the extent of such transformation being a function of motor speed and thus difficult to accommodate within the controller).

These features, although individually known in an academic sense, are not believed to be used in combination in typical, commercially-built electric motors, nor are the impact of these design features upon the controller widely considered or understood. In fact, the amalgamation within one organisation of both motor design and motor control is atypical within the industry. It will also be appreciated that this combination of features can be used to create a generator with unique characteristics that impact upon the design of the generator controller. In particular, the generator will provide an output that lends itself to DC rectification.

It is an aim of the present invention to provide a controller that can provide high electrical speed drive using power electronics. The control approach described here is substantially different from the conventional pulse width modulation approach, which synthesises an entire waveform from one switching process. A pulse width modulation controller would require an output load with high inductance, in order to smooth the successive pulses into an alternating waveform. A brushless DC motor, with a square-wave voltage input would likewise require high inductance. This requirement for high inductance can also be a limitation in the performance of the motor, especially at high mechanical and electrical speed.

According to the present invention, there is provided a control system for an alternating current electric motor comprising means for supplying excitation current to different windings of the motor at any given time, wherein the amplitude of the excitation current is independently variable of the timing and duration of excitation current delivery.

In a preferred embodiment, the supply means comprises an excitation current supply feedback loop for providing a current amplitude (which corresponds to an 'aggregate current') to the motor windings, and a commutation feedback loop separate from the excitation current supply feedback loop for controlling the timing and duration of excitation current supplied to the motor windings. Said excitation current may be an aggregate current. The current supply feedback loop may comprise an input for representing a target motor speed, and means for providing a current amplitude responsive to the target speed of the motor and the motor speed signal. The current supply feedback loop may further comprise a regulating feedback loop for regulating the current amplitude.

Means, which may be in the form of a sensor, may be provided for providing a signal indicative of the motor speed and/or the angular position of the motor. The angular position indication may be a rough or quantized measurement, not necessarily a fine angular measurement. This means may be a commutation signal or current indicative of the current induced in the motor windings.

The commutation feedback loop may be operative for the control of the timing and duration of the current pulses to the motor windings in dependence upon the angular position signal. The movement of the motor generates a back EMF in each phase winding that corresponds to a position signal. The commutation feedback loop provides a current pulse to a given phase winding when the amplitude of the sensed back EMF for the corresponding phase winding is greater than the back EMF sensed in respect of the other ones of the plurality of phase windings. The commutation feedback loop may comprise a filter for filtering the sensed back EMF to smooth the signal and/or to facilitate synchronisation between the supply of the current to said given winding and the angular position signal. The filter may be operative to introduce a phase shift to the sensed back EMF to facilitate said synchronisation. The motor may comprise three phase windings at 120 degree relative angular displacement. Also to facilitate synchronisation between the supply of current and the angular position sensor, the back EMF used to sense motor position may not be measured from individual phase windings but from combinations thereof (for example, the sum or difference of back EMF across two phase windings), which may entail a known phase offset from the back EMF present on an individual phase In an alternative embodiment, the sensor for providing a signal indicative of the motor speed and/or the angular position of the motor may be a Hall Effect sensor or an optical sensor associated with an output shaft of the motor.

According to the present invention there is further provided a control system for an alternating current electric motor, the control system comprising a commutation circuit operative for controlling a timing and duration of current supplied to the electric motor, and a power supply for supplying current to the motor, wherein the commutation circuit is operationally independent of the power supply.

According to the present invention there is yet further provided a permanent magnet motor comprising a control system as defined above, wherein the motor includes a plurality of permanent magnets disposed about a rotor such as to provide a continuous magnetic shell without gaps between the magnets. It may be appreciated that the permanent magnets utilised by such a motor can be any magnetised material where the control the motor does not rely upon the ability to vary the magnetic strength. The motor may comprise a plurality of windings disposed about the magnetic surface in a number of slots such that each slot may be energised by a single current pulse.

Furthermore, an ideal arrangement for the permanent magnet motor provides that the number of slots arranged around the circumference of the motor, divided by the number of magnets disposed about the rotor of the motor is a multiple of the number of phases of the current. It may be appreciated that the number of windings of the motor may be tailored to achieve this ratio.

According to the present invention there is also further provided a forced induction system for an internal combustion engine comprising a control system as described above. Such forced induction system may be a supercharger or may be a turbocharger. In an exemplary aspect of the invention, the forced induction system is for an internal combustion engine, wherein the system comprises a compressor, a turbine, a generator, an electric motor and a control system. In said aspect, the compressor acts to increase the pressure of gas into the engine and is mechanically decoupled from the turbine which is arranged to be driven by the engine exhaust gas and to drive a generator electrically connected to the electric motor. In turn, the compressor is driven by the electric motor and therefore the compressor is driven, at least in part, by the output torque of the turbine via the electrical connection. In such aspects, the electric motor is controlled by the control system described above.

In a further aspect of the present invention, there is provided a generator for generating electric power, the generator comprising: a rotor having a plurality of permanent magnets evenly and continuously distributed around the motor; a stator having a plurality of windings, wherein rotation of the rotor relative to the stator windings generate a plurality of phase shifted square waveforms; and a control circuit, wherein the control circuit comprises a commutation circuit arranged to draw current from the stator windings, said control circuit controlling the timing and duration of drawing off of the current from the windings independently of the rotation of the rotor.

In an alternative or additional aspect, there is provided a permanent magnet generator including a plurality of permanent magnets in contact with one another without spaces between the magnets such as to provide a continuous permanent magnet shell. Such a permanent magnet generator may comprise a plurality of phase windings disposed in a number of slots around the circumference of the generator or permanent magnet shell such that each phase winding may be complementarily energised by a single excitation current and do not serve to counteract one another. Furthermore, said generator may be arranged such that the plurality of phase windings are individually disposed within the slots in parallel and such that the number of slots divided by the number of magnets is a multiple of the number of phases of the excitation current.

Embodiments of the invention are advantageous in that they provide for variation of the motor speed (torque) independently of the commutation. This is effected by supply of an aggregate current to the motor independently to the commutation that directs that current to the appropriate motor phase winding(s). Aggregate current can be regulated using a PWM approach, and there may be a requirement for inductance between the current supply controller and the commutation controller in order to smooth that PWM output. However, the frequency of the PWM current supply controller and the inductance that may be required to regulate the output of the current supply controller are parameters that are essentially independent from the inductance and rotational speed of the motor. This means that the frequency of the PWM signal need not be higher than the motor's operating frequency, as in prior art arrangements. The commutation controller, which sits between the current supply controller and the motor, does not implement PWM. Rather, the commutation controller simply directs the current to the correct winding according to the angular position of the motor. Because the commutation controller does not implement PWM, its design is relatively simple and it can achieve high motor operating speeds. Also because the commutation controller does not implement PWM, the motor need not exhibit high inductance and its efficiency (especially at high electrical/mechanical speeds) is thus improved. This means that higher motor speeds are possible without the need for one integrated high power electronic controller to provide for the commutation and also regulate total current in a single step.

The invention will now be further described by way of example with reference to the accompanying drawings, in which:

FIG. 1b represents the structure of the conventional motor of FIG. 1a;

FIG. 2b represents the structure of the motor of FIG. 2a

FIG. 8b is a waveform diagram of the rectified phase currents shown in FIG. 8a.

Figure 1A:
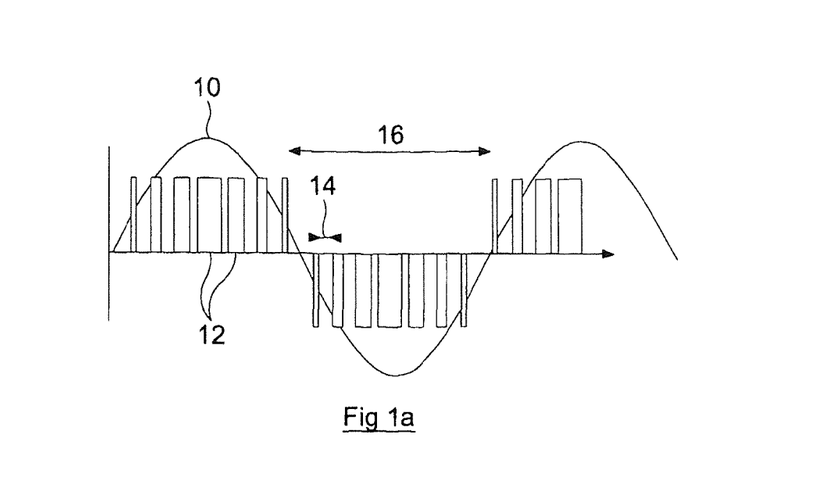
FIG. 1a is a waveform diagram of a conventional motor.
Figure 1B:
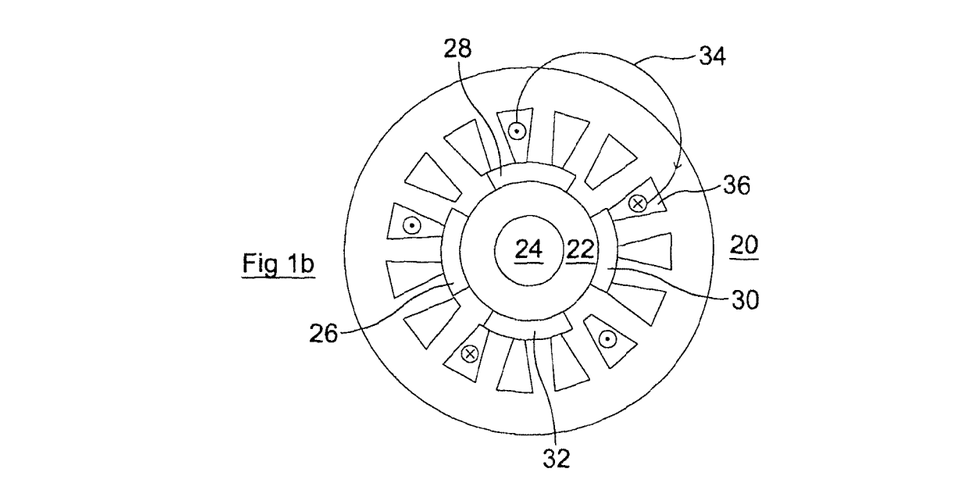

FIG. 1a shows the ideal current 10 that must be supplied to each phase winding in a prior art synchronous AC motor, as shown in FIG. 1 b, (or conversely the current generated by a prior art synchronous AC generator). As will be explained later, ideally a sinusoidal current 10 (with commutation frequency 16) is optimal for this type of prior art motor and care and effort is taken to provide as close a representation 12 of a sinusoidal wave pattern as possible when driving such a prior art motor. One commonly used technique to achieve this ideal waveform is Pulse Width Modulation (PWM). PWM involves providing a number of current pulses 12 to the device of varying duration. By varying the average pulse width and the timing of the pulse (switching frequency 14) an overall current approximating a sinusoidal wave can be generated. Amplitude is varied by controlling the average pulse width and commutation is controlled by changing the timing of the pulses. Generally, the current pulses 12 are applied with multiple phases, most preferentially three different phases differing by 120 degrees.

FIG. 1 b shows a prior art brushless AC motor 20 with a four pole permanent magnet rotor 22 which is mounted on a shaft 24. In this type of motor 20, the motor has four magnetic poles spaced around its circumference. The magnetic poles are provided by four permanent magnets 26, 28, 30, 32 spread around 360 degrees; however each magnet spans only 60 degrees, separated from its neighbours by 30 degrees dead space. The magnets 26, 28, 30, 32 naturally generate a 'blocky' north-south-north-south magnetic field around the motor.

An example of how the windings 34 of the 3-phase voltages are distributed around the magnets as shown in FIG. 1b. Only one loop of the winding 34 has been shown for clarity. It may be seen that the winding 34 emerges from the slot 36 adjacent to magnet 28, before passing through the slot 36 adjacent to the edge of magnet 30. This winding pattern creates differing magnetic fields within the windings dependent upon the relative position and direction of the winding relative to the magnets of the motor. It may, of course be appreciated that by varying the winding pattern the properties of the motor may be tailored.

Figure 1C:
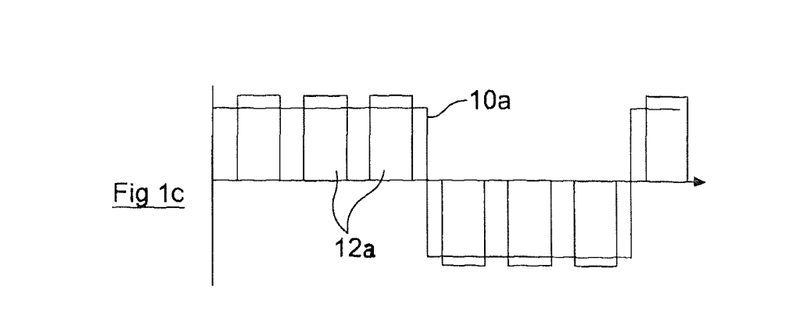
FIG. 1c is a waveform diagram for an alternative conventional motor.
Figure 4:
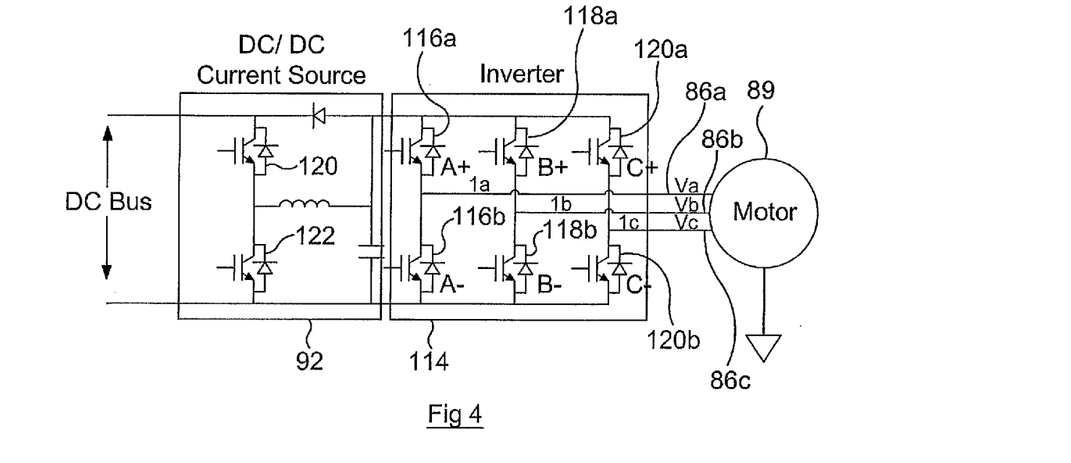
FIG. 4 is a block diagram showing a detail of the circuit of FIG. 3.

Conventional motors have their windings distributed so as to break up the 'blocky', on/off excitation that would naturally be caused by the magnets. In this example of a typical motor winding pattern, 15 slots 36 are available for the windings 34 so that each phase of the input voltage is wound around 5 slots. As 5 is not a multiple of the number of magnetic poles on the rotor (4) it is impossible for all 5 coils of one phase to be excited in the same way by all the magnets at the same time. Rather, the various coils of the same phase are excited by different amounts at different times. Furthermore, the 5 coils are not evenly spread around the stator but instead distributed as shown in FIG. 1 b. If this machine is a generator, the potential created in each coil (all of which are connected in series for one phase) changes more-or-less independently from one another as the rotor moves, and the distribution of the coils is chosen such that the total potential rises and falls in a nearly-sinusoidal pattern In conventional brushless DC control, six IGBTs (A+, A−, B+, B−, C+, C−) such as illustrated in FIG. 4 are utilized to control both the commutation (timing) and voltage regulation (quantity). Voltage regulation is implemented by Pulse Width Modulation (PWM) as shown in FIG. 1c. Pulses 12a of constant voltage amplitude are supplied to the motor and form a square-wave voltage 10a. In this case the amplitude of the voltage 10a is determined by the number of pulses and their duration or width (the duty cycle). The inductance and resistance of the motor provides an inherent regulation of current. However, the inductance and resistance of the motor reduce efficiency and make the motor unsuitable for very high electrical/mechanical speed applications.

Additionally, to produce a relatively steady, low current from the on-off switching of the PWM controller requires the windings 34 of the DC brushless motor to exhibit high inductance. Furthermore, to implement this sort of PWM control on the same IGBTs that control commutation means that the switching frequency 14 of the IGBTs must be significantly higher than the switching frequency of commutation 16 and higher still compared to the speed of rotation of the motor shaft. This makes the method impractical at high electrical speeds. For example, IGBT switching frequency in a PWM motor controller would typically be at least 10× higher than the commutation frequency for a motor with sufficiently high inductance to smooth the resulting PWM output. Furthermore, in the type of motor suggested in the preferred embodiment of the present invention, which entails very low inductance and high efficiency, the IGBT switching frequency 14 would need to be at least 100× higher than the commutation frequency 16. With the high operating speeds desired of embodiments of the present invention, this control approach becomes impractical.

Conversely, the motor 40 employed by the current invention uses a 12 slot design. A representation of this motor is shown in FIG. 2b. In this motor, the four magnets 41-44 span the full 360 degrees of the rotor 46 without any dead space, creating a continuous permanent magnet shell, so the motor is (in general) 50% more powerful for a given size compared to the 15-slot motor. 12 slots 48 and three phases 50 allow 4 coils or slots per phase, which corresponds to the 4 magnetic poles on the rotor. Therefore each coil 50 can always be fully excited by the magnets 41-44. The coils 50 in any one phase are wound clockwise-anticlockwise-clockwise-anticlockwise, so the north-south-north-south magnetic field reinforces and drives the maximum current through the stator (in the case of a generator) or creates maximum torque from a given current (in the case of a motor). However, as a generator this machine would supply a square-wave output that is difficult to deal with. Similarly as a motor 40, smooth rotation of the shaft 47 requires a square-wave current input 60 which is difficult to supply. For these reasons, a motor with the features of this 12-slot machine described here is not a popular choice in most prior-art applications. If this motor were chosen for its compactness and efficiency and then driven using a prior-art PWM controller, the result would be unsmooth (varying with time) motor output and additional electrical losses, negating some of motor's inherent benefits.

Figure 2A:
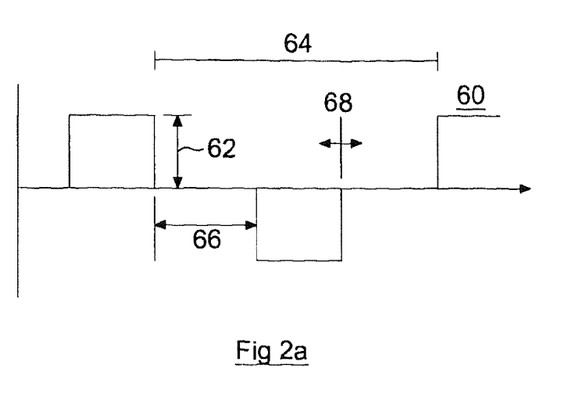
FIG. 2a is a waveform diagram of a motor that can be utilised in embodiments of the present invention.
Figure 2B:
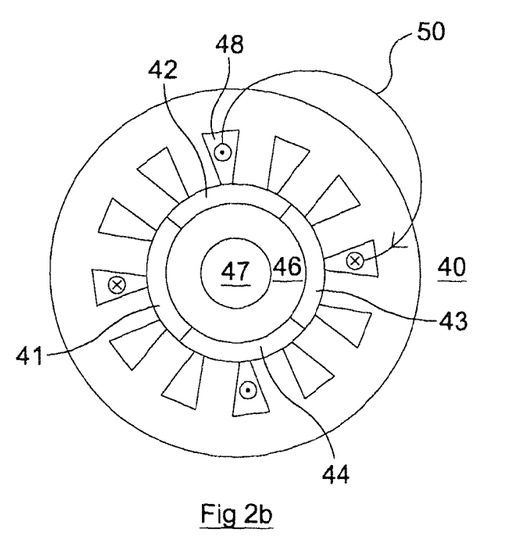

FIG. 2a shows the current 60 that must ideally be imparted upon each phase winding 50 for a motor 40 (FIG. 2b) designed for square-wave input. In addition, gaps 66 are necessary as a function of stator geometry and to prevent non-ideal excitation of the rotor when the magnetic poles of the rotor are not aligned with the permanent magnet energised by the coil. During these gaps 66, current is imparted by a different phase. The relevant switching points 68 between the application or removal of current is the commutation timing and ideally occurs when the pole of the rotor passes into or out of the influence of the magnet energised by the windings.

In order to achieve high speed and high efficiency, the resistance and inductance of the windings 50 are much smaller than in a typical DC brushless motor, such as the prior art motor of FIG. 1b. At any moment during the motor's operation, one phase 50 is connected to the positive (current travelling in), one phase is connected to the negative (current travelling out), and one phase is floating (no current). In order to maximize the performance of the motor, the current should be injected to each phase 50 when that phase exhibits the maximum back EMF compared to the other phases and should return from each phase when that phase exhibits the minimum back EMF. The commutation timing 68 must be accurately controlled. If the back EMF is ideal, the commutation timing 68 can be obtained by comparing the three phase voltage (e.g., when a phase exhibits the greatest back EMF, then that phase current is switched 'on').

Figure 3:
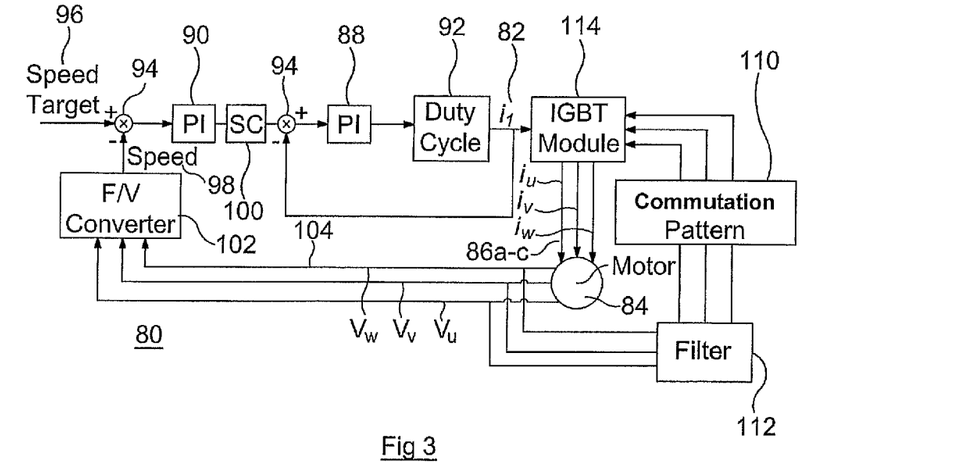
FIG. 3 is a functional block circuit diagram of a control circuit embodying the present invention.

Ideally, the amplitude 62 needs to be independently variable with respect to the commutation frequency 64. FIG. 3 shows a main embodiment of the present invention and details the controller 80 used. A principle feature of this controller 80 is that it addresses power separately from commutation. This control approach is achieved by a logical separation between the control of aggregate current i1 82 flowing to the motor 84 and the commutation of that current iu, iv, iw 86a-c on the phase connectors of the motor 84.

The aggregate current 82 has two proportional-integral (PI) feedback control loops 88, 90 that regulate aggregate current 82. The inner loop 88 controls the current amplitude directly and the outer loop 90 adjusts the current in response to the torque requirement (speed/target speed mis-match) of the motor 84.

The inner loop 88 comprises a duty cycle 92 that provides the amplitude of the aggregate current 82 and a (amplitude) regulator 94 that compares the present aggregate current 82 to the current requested by the outer loop 90. If the aggregate current 82 requested by the outer loop 90 is greater than the currently supplied aggregate current then the current is adjusted to match the desired current by the duty cycle 92. It can be appreciated that the inner loop 88 can be considered to be a regulating feedback loop for regulating the current amplitude.

The outer loop 90 also comprises a (speed) regulator 94 that compares a speed target 96 with the current speed of the motor 98 and determines the aggregate current 82 required to accelerate to the speed target 96. A saturation check 100 is provided to ensure that the current requirements are within the capability of the controller 80 and the motor 84. The speed of the motor is provided by a F/V converter 102 that analyses back EMF signals Vw, Vv, Vu 104 obtained from the motor and converts them to determine the motor speed 98 and the angular position of the motor (and the magnets). The components used to regulate the aggregate current 82 (the inner and outer feedback control loops 88, 90) may be considered as a current supply feedback loop for providing a current amplitude to the motor 84 windings.

The use of the back-EMF signal generated by the strong permanent magnets moving past the windings in the motor is advantageous because the back-EMF manifests itself as an oscillating variation in the apparent electrical resistance across each phase connection of the motor's stator winding. This gives an indication of the instantaneous position of the rotor relative to the stator and thus the appropriate timing for the electrical excitation of the stator. By this method, the motor's phase connections carry the output of the motor controller (oscillating current to excite the motor's stator windings) as well as one of its inputs (back-EMF to determine the commutation pattern).

Although the present invention utilises back-EMF signals to determine motor speed and position, alternative ways of monitoring the motor and producing reference signals may be utilised. Examples of alternatives include: the use of an external rotor position sensor, most likely an optical type or electromagnetic interference (Hall effect) sensor type responding to markings or shapes (e.g., compressor blades) on the motor shaft; the use of a timekeeping device internal to the controller, which is regularly calibrated or reset (e.g., once per motor shaft rotation) by a coarse sensor; a measurement of the commutation current, or a signal indicative thereof, relating to the current induced in the motor windings (not the total current going to the motor); and the use of purely internal logic and timekeeping which makes assumptions about the position of the rotor and the required commutation without expecting or without caring that this may fall out of synchronicity with the true, optimal commutation timing (e.g., the rotor may 'slip' relative to the electrical excitation).

This two-tier approach is implemented in order to prevent an over-current condition, because the motor 84 is optimally designed for very low internal inductance and is therefore highly sensitive to damage unless current 82 is tightly controlled on a short timescale. To control speed 96, the control system 80 measures the frequency of the motor back EMF 104 to get the motor speed 98. By setting the current command 90 to the inner loop 88, the control system can control the torque. If the motor 86 needs to accelerate, the controller 90 will increase the current command to increase the torque.

The commutation of the aggregate current 82 is implemented separately and is shown to the right of the motor 86. The commutation pattern 110 responds passively to the motor position as measured by tracking the back-EMF 104 displayed on the phase connectors. The preferred embodiment uses the phase-to-phase voltage to measure back-EMF. This would normally lead in phase by 90 degrees relative to the optimal current commutation timing, based on the typical properties of motors (see below). The preferred embodiment therefore implements a low-pass filter 112 which produces a 90 degree phase shift in the measured phase-to-phase voltages. This low-pass filter 112 additionally removes errors from the back-EMFsignal 104 and simultaneously adjusts the phase angle so that the timing is appropriate for use as a current commutation control signal.

Once the commutation pattern 110 is determined, it is provided to the IGBT module 114. The aggregate current 84 can then be regulated by the IGBT module 114 in the required commutation pattern 110 to deliver the required current iu, iv, iw 86a-c to the motor 84. This combination of components 110, 112 and 114 act as a commutation feedback loop for controlling the timing and duration of excitation current supplied to the motor windings.

FIG. 4 highlights the duty cycle 92 and the IGBT module 114. The duty cycle 92 acts as a "DC/DC current source" part and creates a nearly continuous current of controlled aggregate amperage 82. The duty cycle has two IGBTs 120, 122 and by switching on and off the IGBTs, the aggregate current 82 can be regulated. The duty cycle 92 is connected to the IGBT module 114, which acts for a three phase signal as a six-leg inverter. Because of the high fundamental frequency of the motor, this IGBT module 114 only controls the commutation, and need never interrupt the aggregate flow of current to control power (as it would have to do in a more conventional control layout). The "inverter" part takes as input a commutation signal from a digital controller (not shown) and the aggregate current 82 produced by the duty cycle 92.

As output, the IGBT module 114 produces square wave current signals to drive the PM motor. The function of the IGBT module 114 is to deliver whatever aggregate current 82 is available from the duty cycle 92 directly to the motor 84 using the simple switching pattern shown in FIG. 2a. For each phase of current 86a-c, two IGBT's are provided. The commutation pattern for current iu 86a is provided by IGBT's 116a, 116b that switch on and off the aggregate current 82 supply to the required commutation pattern 110. Similar IGBT's 118a, 118b, 120a, 120b perform the same function for each additional phase of current iv 86b, iw 86c. Therefore the current supplied by each phase can be either positive, negative or zero.

The primary advantage of this approach is that it removes the need for IGBTs to operate at impractically high frequencies. It also enables the motor 86 to be built with lower inductance. Finally, this approach removes from the motor's phase windings the disturbances that are normally associated with PWM control. This makes the back EMF signals 104 clearer and improves the accuracy of commutation timing 110. At high electrical speeds, the efficiency of the controller 80 is highly sensitive to the commutation timing 110. Therefore, the additional feature of removing disturbances from the phase windings further improves the efficiency of this approach.

Figure 5A:
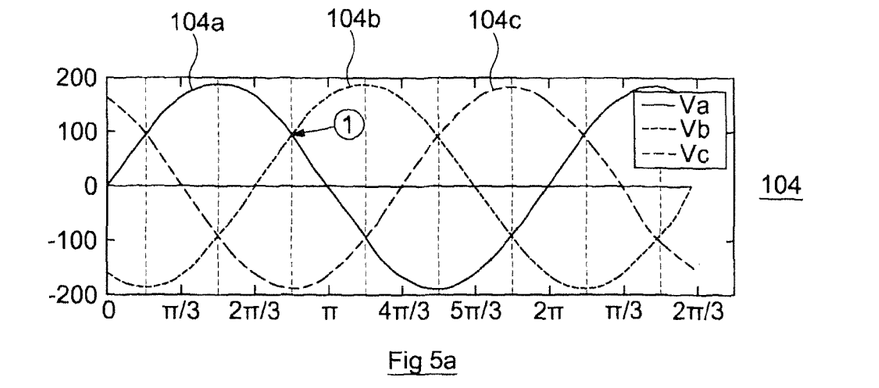
FIG. 5a is a waveform diagram showing an ideal back EMF in a three phased motor (named a, b, and c) utilized in an embodiment of the present invention.

The back-EMF signals 104 generated by the motor 86 are shown if FIG. 5a. The three back-EMF signals 104a, 104b and 104c correspond to the three phases of the input currents 86a, 86b, 86c. The back-EMF shown in FIG. 5a is idealised. In reality the back-EMF signal 104 is often choppy and distorted, making determining the angular position of the motor and therefore determination of the commutation timing difficult. Furthermore, in practical motor control, the commutation itself disturbs the back-EMF 104 because of the rapid phase current changes. This disturbance can deform the shapes of the back-EMF wave forms, which makes the comparison between them no longer reliable. Additionally, due to the practicalities of wiring the controller, measuring a single back-EMF 104a is difficult.

Figure 5B:
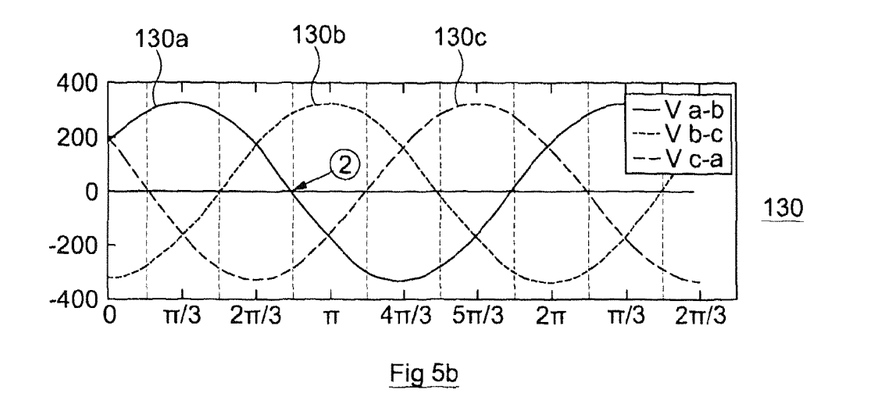
FIG. 5b is a phase to phase back EMF derived from measuring total back EMF across two phases (a and b, b and c, a and c)

In the present embodiment, the reliability of the back-EMF signal is further improved by measuring the phase-to-phase voltages 130 of the back EMF 104 (allowing the controller to monitor the same wires that are used to impart current to the motor) as shown in FIG. 5b. However, the phase-to-phase voltages 130 (back EMF's) are not aligned with the phase voltages (back EMF's) 104. For example, the Phase A and Phase B crossing point (marked as Point 1) in FIG. 5a would be the Phase A-B zero crossing point (marked as Point 2) in FIG. 5b. As the phase to phase crossing point determines the optimal position for switching the current supplied to the motor to the next corresponding phase, determination of this position is critical to ensure efficient use of the motor. The phase-to-phase voltage is the difference between two phase voltages, and so the difference in phase between these two signals can be calculated as follows:

Phase $A$ voltage: $\sin(x)$

Phase $B$ voltage: $\sin(x-pi/3)$(120 degree phase offset in 3-phase motor)

Phase $A$-to-$B$: $\sin(x)-\sin(x-pi/3)=\sqrt{3}\sin(x+pi/6)$ (a waveform 30 degrees ahead of $\sin(x)$)

Figure 6:
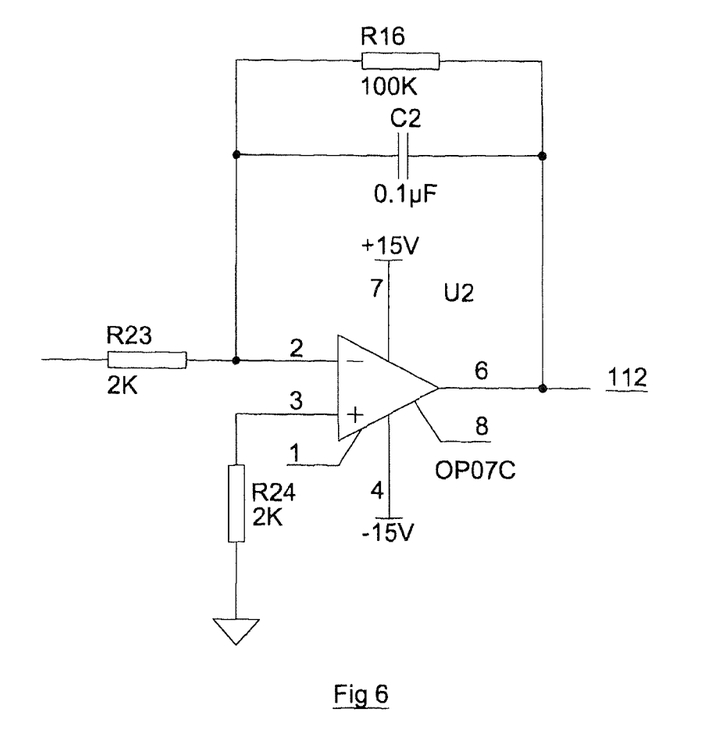
FIG. 6 is a circuit diagram of a low-pass filter that may be used in the control circuit embodying the present invention.

The phase to phase crossing point (point 1 in FIG. 5a) is no longer within an easily determined position (point 2 in FIG. 5b). In order to get a reliable signal, the three phase back EMF is therefore filtered before the comparisons are carried out. The low pass filter 112 design is shown in FIG. 6. The transfer function for the filter 112 is $$\frac{50}{0.01S+1}$$

Figure 5C:
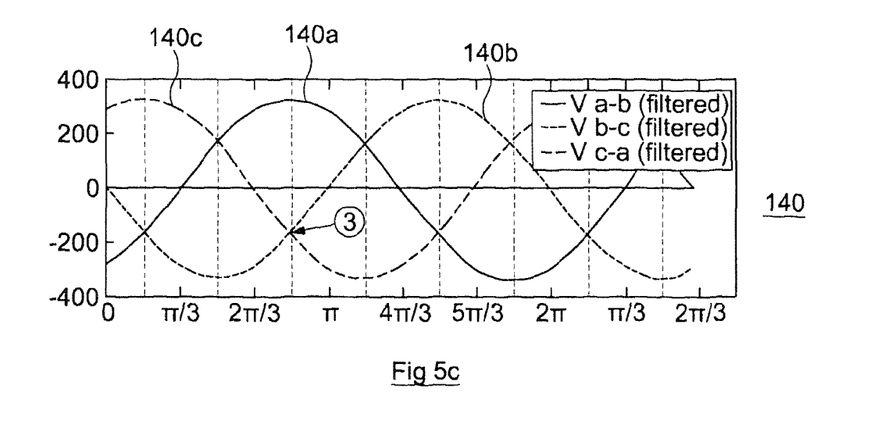
FIG. 5c is a filtered waveform diagram of the phase to phase waveform of FIG. 5b.

With increasing motor speed and electrical frequency, the behaviour of this filter 112 approaches a pure integral, and the time lag produced by this filter approaches 90 degrees lag. A representation of the filtered phase to phase signal 140 is shown in FIG. 5c.

Table 1 shows the degree of phase shift imparted by the filter at the different speeds of the motor. It can be seen that for a large range of the motor speed (from 200 Hz to 2000 Hz), the phase shifts are very close to 90 degree.

TABLE 1

Phase shift VS RPM

| Motor speed | Phase shift |
|---|---|
| 1000 RPM | 64.5 degree |
| 5000 RPM | 84.5 degree |
| 10000 RPM | 87.27 degree |
| 40000 RPM | 89.31 degree |
| 120000 RPM | 89.77 degree |

As stated above, the ideal switching timing is obtained by considering the crossing points between phase voltage signals. But the controller uses filtered phase-to-phase voltage signals, which are in total 60 degrees behind the phase voltages (30 degrees-90 degrees). Because a commutation event occurs every 60 degrees (see FIG. 5c), these filtered phase-to-phase voltages can be used, although the mapping of which crossover points are associated with which phase current signals is different to the mapping that would apply if the phase voltages were used.

FIG. 5c shows the filtered phase to phase signals with 90 degree phase shift considered. Aligned with Point 1 and 2 in FIGS. 5a and 5b, the corresponding point in FIG. 5c is marked as Point 3 which is the crossing point between Phase B-C and Phase C-A. FIG. 5c shows that, despite the constant phase shift, the commutation timing 110 for current switching can still be determined by comparing the magnitudes of the filtered, phase-to-phase voltages.

Figure 7A:
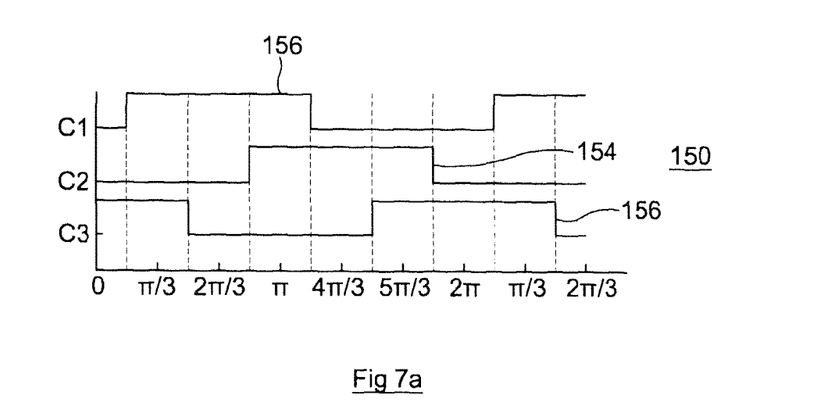
FIG. 7a is the binary output from three comparison operations acting on the phase to phase back EMF signals (for example, C1=1 when Va-b>Vb-c)
Figure 7B:
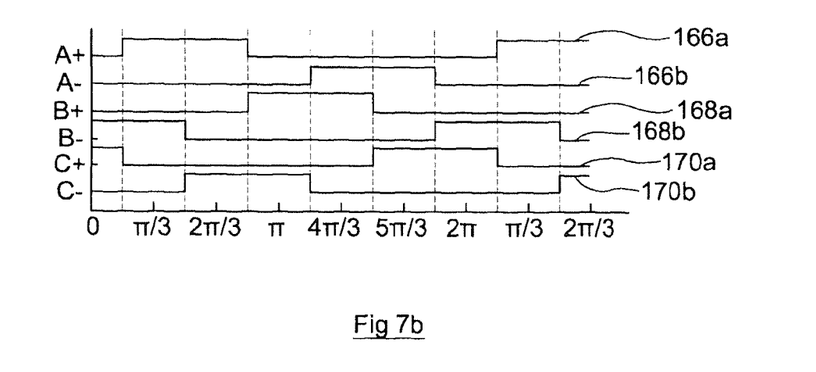
FIG. 7b is a wave form diagram of the commutation of the current to the individual phases that may be derived by the control circuit embodying the present invention.

The three voltage signals produced by the phase-to-phase voltage filter can then be compared using well-known electronic components. The results of the comparisons can be decoded to generate the commutation output, as can be seen in FIG. 7a. C1 152 is the comparison results between the filtered Va-b and Vb-c. C2 154 is for Vb-c and Vc-a. C3 156 is for Vc-a and Va-b. The six IGBTs 116a, 116b, 118a, 118b, 120a, 120b which control the commutation pattern of current to the motor can be controlled completely and optimally by the signals C1, C2, C3, as shown in the bottom graph of FIG. 7b. When the A+ IGBT 116a is switched on, the positive current is injected into Phase A 166a. When, A− 166b is on, negative current is injected into phase A 166b. By comparison between the waveform C1 (152) of FIG. 7a and the A+, and A− waveforms of FIG. 7b, it may be seen that the point when C1 152 switches from negative to positive occurs at π/6. This point of π/6 corresponds to the point at which IGBT116a must be switched to provide A+ current 116a. Similarly, the point at which C1 goes from positive to negative π/6 corresponds to switching point of A− 166b by switch 116b.

Thus the controller 80 imparts upon the motor's phase connections 86a-c oscillating current signals whose waveforms are shaped and spread (phase offset) in such a way that the sum of their absolute values is always equal to the constant (aggregate current 82) signal from which they were constituted. This multiphase commutation pattern 110 is the controller's output and is sent to the phase connection points available in the motor's stator winding. This controller 80, including the commutation part, is electronic, rather than mechanical, which improves efficiency and reliability compared to rubbing or sliding mechanical switches embedded in the motor and potentially moving at high speed.

It may also be appreciated that the controller 80 may be used to run the motor 84 as a generator. In such embodiments, movement of the rotor of the generator relative to the stator causes a current to flow within windings of the stator. The commutation circuit in such embodiments pulls the current off the windings, creating (in the above example) a three phase power signal. When the controller 80 operates the motor 84 as a generator, the controller 80 continues to operate in the same manner as described above, independently of the current source. However, when the motor 84 is run as a generator, the current source is essentially reversed and so the direction of the current flow is also reversed causing current to flow out of the commutation circuit and motor 84. Due to the arrangement of the motor or generator, such output is a DC signal or current. By varying this DC current between positive and negative setpoints, the controller allows rapid and seamless transition from motor to generator to motor.

Figure 8A:
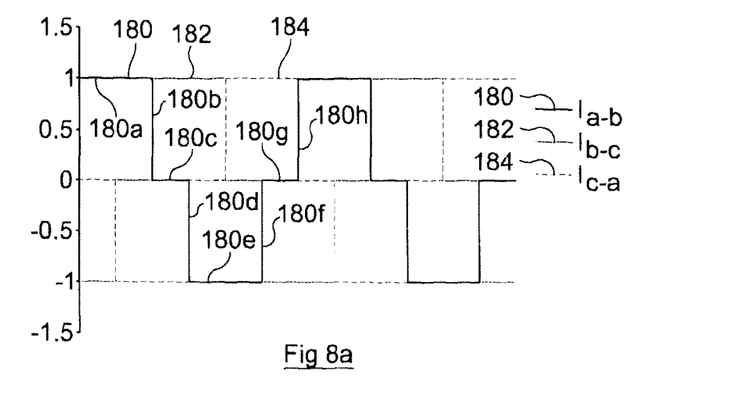
FIG. 8a is a wave form diagram of phase currents generated when the motor of FIG. 2b is utilised as a generator.

When run as a generator, said power signal can then be passed through a rectifier to create a DC current. Advantageously, the commutation pattern produced by the generator embodiment of the present invention is a series of square waveforms as shown in FIG. 8a and similar to those shown in FIG. 7a. As may be seen from FIG. 8a, the generator (of the form of the motor 40) produces three phase current signals 180 (comparison between A and B of FIG. 7b), 182 (comparison between B and C of FIG. 7b) and 184 (comparison between C and A of FIG. 7b). Each of the three phase signals generated 180, 182, 184, produce a signal that varies from a positive phase current 180a to a negative phase current 180e via zero net phase current plateaus 108c, 180g and stepped functions 180b, 180d, 180f, 180 h between the positive, negative and net zero plateaus. It can be appreciated that the exact form of the waveforms is likely to vary from this idealised normal representation.

Figure 8B:
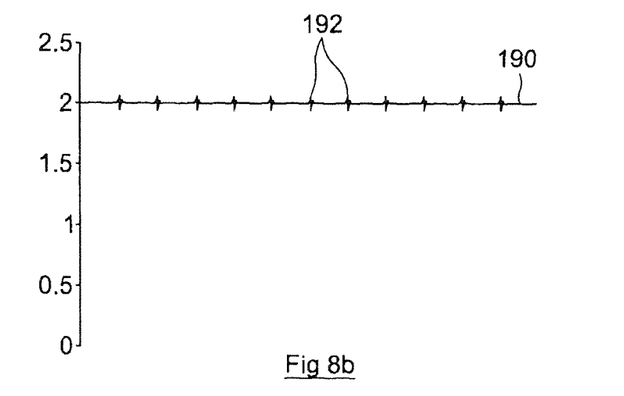
Figure 8C:
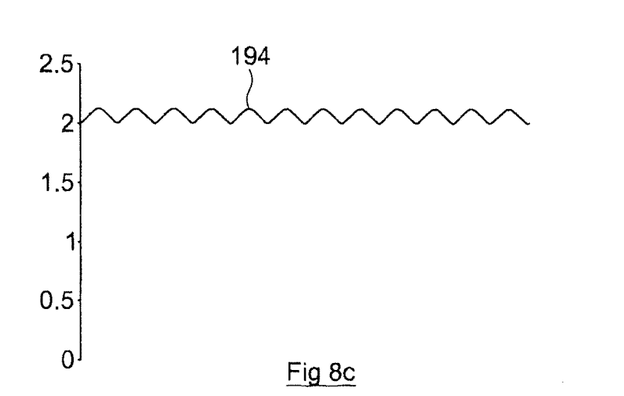
FIG. 8c is a waveform diagram of the rectified phase current from a conventional generator.

The type of generator described here produces square wave output 180, 182, 184 from the individual generator phases, which, when rectified to DC, is smooth 190 (except for harmonics 192). A representation of the rectified DC current is shown in FIG. 8b. Harmonics 192 may occur during the transition from one square-wave phase output 180 to the next 182 (at each step function interval). However, after harmonics 192 are removed, the overall signal 190 is smoother than a rectified 3-phase sinusoidal signal 194 as shown in FIG. 8c. (The signal 190 varies by approximately 0%, rather than the 10% typical of rectified 3-phase sinusoidal signals 194.) This is desirable, since many industrial applications are naturally capable of filtering harmonics but incapable of tolerating bulk fluctuations caused by rectifying sinusoidal signals. Furthermore, the skilled reader will appreciate that several methods exist to filter short-duration harmonics of the type produced when rectifying square-wave input.

If the machine is designed purely for generator operation, then the controller could be simplified to a rectifier, rather than the full controller described here. Whatever the control method used for the generator, the particular combination of features described here will create a generator that lends itself to produce a DC power output signal.

The invention claimed is:

1. A permanent magnet electric rotating machine comprising:
   a plurality of phase windings disposed in a number of slots around the circumference of the electric rotating machine such that the phase windings in each phase are complementary and do not serve to counteract one another when energized by a single excitation current;
   a plurality of permanent magnets; and
   a control system comprising:
      a power supply for supplying excitation current to or from the electric rotating machine; and a commutation circuit operationally independent of the power supply, and operative to control a timing and duration of supply of the excitation current transmitted to or drawn from individual of the phase windings, wherein the power supply comprises a current supply controller for regulating a current amplitude using a pulse width modulation approach, wherein the current amplitude is supplied to or drawn from the individual phase windings;

wherein rotation of the electric rotating machine generates a back EMF in each phase winding, wherein the commutation circuit comprises a commutation feedback loop transmitting a current pulse of the excitation current to or from a given phase winding when an amplitude of the back EMF for the given phase winding is greater than the back EMF in respect of the other ones of the plurality of phase windings, wherein the commutation feedback loop comprises a filter for filtering the back EMF, the filter introducing a phase shift to the back EMF to synchronize said current pulse and an angular position.

2. The permanent magnet electric rotating machine according to claim 1, wherein the plurality of phase windings are individually disposed within the slots in parallel.

3. The permanent magnet electric rotating machine according to claim 1, wherein the number of slots divided by the number of magnets is a multiple of the number of phases of the current.

4. The permanent magnet electric rotating machine according to claim 1, wherein the current supply feedback loop further comprises a regulating feedback loop for regulating the current amplitude.

5. The permanent magnet electric rotating machine according to claim 1, further comprising a means for providing a signal indicative of the electric rotating machine speed and/or the angular position of the electric rotating machine.

6. The permanent magnet electric rotating machine according to claim 5, wherein the commutation feedback loop is operative for the control of the timing and duration of the current to/from the windings in dependence upon the angular position signal.

7. The permanent magnet electric rotating machine according to claim 6, wherein the back EMF in each phase winding corresponds to said angular position signal.

8. The permanent magnet electric rotating machine according to claim 5, wherein the signal indicative of the electric rotating machine speed and/or angular position of the electric rotating machine are measured by the control means is a commutation signal indicative of current induced in the windings.

9. The permanent magnet electric rotating machine according to claim 1, wherein the current supply feedback loop comprises an input for representing a target electric rotating machine speed, and means for providing a current amplitude responsive to the target speed of the electric rotating machine and the electric rotating machine speed signal.

10. The permanent magnet electric rotating machine according to claim 1, wherein the electric rotating machine comprises three phase windings at 120 degree relative angular displacement.

11. The permanent magnet electric rotating machine according to claim 1, wherein the plurality of permanent magnets are arranged to provide an electromagnetic field experienced by the windings near the magnets' edges which is of similar strength to the electromagnetic field experienced near the middle of the magnets.

12. The permanent magnet electric rotating machine according to claim 1, wherein the plurality of permanent magnets are in contact with one another without spaces between the magnets such as to provide a continuous permanent magnet shell.

13. A forced induction system for internal combustion engine with a crankshaft, the system comprising:
a compressor for increasing the pressure of gas into the engine;
a turbine mechanically decoupled from the compressor and arranged to be driven by engine exhaust gas;
a generator arranged to be driven by the turbine; and
an electric motor comprising:
a plurality of phase windings disposed in a number of slots around the circumference of the motor such that the phase windings in each phase are complementary and do not serve to counteract one another when energized by a single excitation current;
a plurality of permanent magnets; and
a control system comprising a power supply for supplying an excitation current to the motor and a commutation circuit operationally independent of the power supply and operative for controlling a timing and duration of supply of the excitation current supplied to individual of the electric motor windings,
wherein the power supply comprises a current supply feedback loop supplying an amplitude of the excitation current supplied to or drawn from the individual phase windings,
wherein rotation of the electric motor generates a back EMF in each phase winding,
wherein an commutation circuit comprises a commutation feedback loop providing a current pulse of the excitation current to a given phase winding when an amplitude of the back EMF for the given phase winding is greater than the back EMF in respect of the other ones of the plurality of phase windings,
wherein the commutation feedback loop comprises a filter for filtering the back EMF, the filter introducing a phase shift to the back EMF to synchronize said current pulse and an angular position signal, and
wherein the electric motor is arranged to drive the compressor, wherein the generator and motor are electrically connected; whereby the compressor is driven at least in part by an output torque of the turbine via the electrical connection.

14. A control system for a permanent magnet electric rotating machine that includes a plurality of individual phase windings, comprising:
a current supply feedback loop for controlling an amplitude of excitation current supplied to or drawn from the individual phase windings of the electric rotating machine; and
a commutation feedback loop operationally independent of the current supply feedback loop and operative for controlling a timing and duration of the excitation current supplied to or drawn from individual of the phase windings in dependence upon an angular position of the electric rotating machine,
wherein rotation of the electric rotating machine generates a back EMF in each phase winding that corresponds to a position signal,
wherein the commutation feedback loop provides a current pulse of the excitation current to, or draws a current pulse of the excitation current from, a given phase winding when an amplitude of the back EMF for the corresponding phase winding is greater than the back EMF sensed in respect of the other ones of the plurality of phase windings, and wherein the commutation feedback loop comprises a filter for filtering the back EMF, the filter introducing a phase shift to the back EMF to synchronize said current pulse and said angular position signal.

15. The control system according to claim 14 wherein the back EMFs are phase-to-phase voltages of the back EMFs generated in different phase windings.

\* \* \* \* \*